United States Patent
Nguyen et al.

(10) Patent No.: US 6,238,596 B1
(45) Date of Patent: May 29, 2001

(54) COMPLIANT AND CROSSLINKABLE THERMAL INTERFACE MATERIALS

(75) Inventors: My N. Nguyen, Poway; James D. Grundy, San Diego, both of CA (US)

(73) Assignee: Johnson Matthey Electronics, Inc., Spokane, WA (US)

( * ) Notice: Subject to any disclaimer, the term of this patent is extended or adjusted under 35 U.S.C. 154(b) by 0 days.

(21) Appl. No.: 09/398,988

(22) Filed: Sep. 17, 1999

Related U.S. Application Data

(62) Division of application No. 09/265,292, filed on Mar. 9, 1999.

(51) Int. Cl.$^7$ .................................................. H01B 1/04
(52) U.S. Cl. .................. 252/502; 252/511; 252/512; 252/514; 252/500; 252/503; 524/74; 524/285; 524/424; 524/439; 524/910
(58) Field of Search .................................. 252/503, 511, 252/512, 514, 500, 502; 524/424, 439, 74, 285, 910

(56) References Cited

U.S. PATENT DOCUMENTS

| | | | |
|---|---|---|---|
| 5,094,769 | 3/1992 | Anderson, Jr. et al. | 252/71 |
| 5,300,569 | 4/1994 | Drake et al. | 525/78 |
| 5,990,217 | * 11/1999 | Nakano et al. | 524/423 |

OTHER PUBLICATIONS

R. Drake, et al., "New Room Temperature Crosslinkable Liquid Elastomers", Rubber Division Meeting American Chemical Society, Dallas, Texas, Apr. 1988 pp. 1–23.
Ricon MA Chemistry, Ricon Resins, Inc., Grand Junction, Colorado 6 pp.
Poly bd Resins, Elf Atochem, 4 pp.
Technical Bulletin SC:2540–97, Shell Chemical Company, Houston, Texas, "Kraton Liquid Polymers: New Versatile, Functionalized Polyolefins", May/1997, 4 pp.
Emigh et al., "Thermal Design Strategy Using Complaint Interface Materials to Cool Multiple Package Systems with Single Heat Sink Solutions", pp 357–361.

* cited by examiner

*Primary Examiner*—Mark Kopec
*Assistant Examiner*—Derrick G. Hamlin
(74) *Attorney, Agent, or Firm*—Fish & Associates, LLP; Robert D. Fish

(57) ABSTRACT

Described is a compliant and crosslinkable thermal interface material of at least one malenized rubber with maleic anhydride adducted to the molecule and at least one hydroxyl terminated olefin rubbers, and a method of making and using same; as well as a method of improving thermal conductivity of polymer systems.

4 Claims, No Drawings

COMPLIANT AND CROSSLINKABLE THERMAL INTERFACE MATERIALS

CROSS REFERENCE TO RELATED APPLICATIONS

This application is a divisional application of application Ser. No. 09/265,292, filed Mar. 9, 1999.

BACKGROUND OF THE INVENTION

As electronic devices become smaller and operate at higher speeds, energy emitted in the form of heat increases dramatically. A popular practice in the industry is to use thermal grease, or grease-like materials, alone or on a carrier in such devices to transfer the excess heat dissipated across physical interfaces. Most common types of thermal interface materials are thermal greases, phase change materials, and elastomer tapes. Thermal greases or phase change materials have lower thermal resistance than elastomer tape because of the ability to be spread in very thin layers and provide intimate contact between adjacent surfaces. Typical thermal impedance values range between 0.6–1.6° C. $cm^2$/w. However, a serious drawback of thermal grease is that thermal performance deteriorates significantly after thermal cycling, such as from −65° C. to 150° C., or after power cycling when used in VLSI chips. It has been also found that the performance of these materials deteriorates when large deviations from surface planarity causes gaps to form between the mating surfaces in the electronic devices or when large gaps between mating surfaces are present for other reasons, such as manufacturing tolerances, etc. When the heat transferability of these materials breaks down, the performance of the electronic device in which they are used is adversely affected. The present invention provides a thermal interface material that is particularly suitable for use as a interface material in electronic devices.

SUMMARY OF THE INVENTION

In accordance with the invention there is provided a compliant and crosslinkable material which comprises a polymer, such as at least one malenized rubber with maleic anhydride adducted to the molecule and at least one hydroxyl terminated olefin rubber and at least one thermally conductive filler. The compliant thermally conductive material has the capability of enhancing heat dissipation in high power semiconductor devices and maintains stable thermal performance. It is not subject to interfacial delamination or face separation during thermal-mechanical stresses or fluctuating power cycling of the electronic devices in which it is used.

The compliant and crosslinkable thermal interface material may be formulated by mixing the components together to produce a paste which may be applied by dispensing methods to any particular surface and cured at room temperature or elevated temperature. It can be also formulated as a highly compliant, cured, tacky elastomeric film or sheet for other interface applications where it can be preapplied, for example on heat sinks, or in any other interface situations.

The filler to be incorporated advantageously comprises at least one thermally conductive fillers, such as silver, copper, aluminum, and alloys thereof; boron nitride, aluminum nitride, silver coated copper, silver coated aluminum and carbon fiber. It may be also additionally useful to incorporate antioxidants to reduce oxidation of the rubbers, wetability enhancing agents to promote wetting of surfaces, curing accelerators, such as would allow curing at room temperature, viscosity reducing agents to enhance dispersability and crosslinking aids. It is also often desirable to include substantially spherical particles of filler to limit the compressibility of the compliant material in interface applications, i.e. to limit or control the thickness.

It has been also found that thermal conductivity of polymer-resin filler systems, such as a combination of filler and the combined malenized rubber and olefin rubber discussed above, can be especially improved by incorporating carbon micro fibers, with other fillers, into the system.

DETAILED DESCRIPTION OF THE INVENTION

A compliant and crosslinkable thermal interface material is formulated by combining at least one saturated or unsaturated malenized rubber with maleic anhydride adducted to the molecule and at least one saturated or unsaturated hydroxyl terminated olefin rubber and at least one thermally conductive filler. More than one rubber of each type may be combined to produce a compliant and crosslinkable interface material. Olefin containing interface materials, with appropriate thermal fillers, exhibit a thermal capability of less than 0.5 $cm^{2°}$ c/w. Unlike thermal grease, thermal performance of the material will not degrade after thermal cycling or flow cycling in IC devices because liquid olefins will cross link to form a soft gel upon heat activation. Moreover, when applied as an interface material it will not be "squeezed out" as thermal grease does in use and will not display interfacial delamination during thermal cycling. The new material can be provided as a dispensable liquid paste to be applied by dispensing methods and then cured as desired. It can also be provided as a highly compliant, cured, elastomer film or sheet for pre-application on interface surfaces, such as heat sinks. Advantageously, fillers with a thermal conductivity of greater than about 0.2, and preferably at least about 0.4, w/m° C. will be used. Optimally, it is desired to have a filler of not less than about 1 w/m° C. thermal conductivity.

The compliant thermally conductive material enhances thermal dissipation of high power semiconductor devices. The paste may be formulated as a mixture of functional liquid rubbers and thermal fillers. The functional liquid rubbers are malenized liquid rubbers, saturated or unsaturated, which contain maleic anhydride adducted to the molecule. For example, malenized polybutadiene (commercially available by Ricon Resins, Inc.), malenized poly (styrene-butadiene), etc. The formula for malenized liquid rubber may be written as follows:

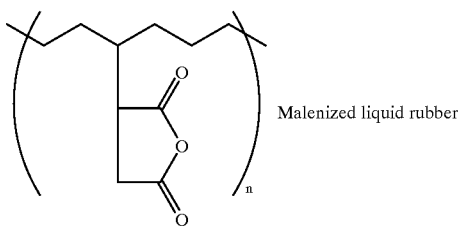
Malenized liquid rubber

Hydroxyl terminated liquid olefin rubbers, saturated or

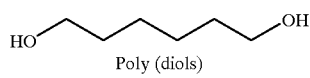
Poly (diols)

-continued

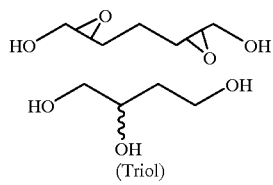
(Triol)

unsaturated, useful in accordance with the invention include, by way of example, hydroxyl terminated polybutadiene, hydroxyl terminated epoxidized polybutadiene, such as available from Elf Atochem of Phildelphia, Pa., hydroxyl terminated hydrogenated polyisoprene, such as available from Kuraray of Japan, hydroxyl functional, poly (ethylene/butylene) polymers, such as Kraton Liquid available from Shell Chemical. The formula for the hydroxyl terminated liquid olefin rubbers may be written as follows:

Trifunctional polydiols, as fatty ether triol might be used for additional crosslinking. The anhydride functional group reacts with the hydroxyl group as follows:

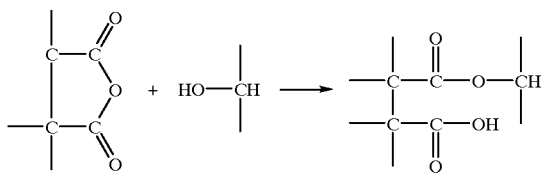

The anhydride functional group can also react with an epoxide to yield an ester linkage. The reaction between the two functional liquid rubbers can occur at temperature about 50 to 150° C. to form a crosslink elastomer network. A tertiary amine may be added as an accelerator which would allow to cure at room temperature. The concentration of maleic anhydride determine the crosslinking density of the elastomer. Physical properties can be varied from a very soft gel material at a very low crosslink density to tough elastomer network of higher crosslink density. The anhydride ring can react with hydroxyls, amines, epoxies to form an elastomer network. Typical liquid rubber mixtures have a viscosity of about 10–200 poises at 25° C.

Thermal filler particles to be dispersed in the liquid rubber mixture should advantageously have a high thermal conductivity. Suitable filler materials include silver, copper, aluminum, and alloys thereof; boron nitride, aluminum nitride, silver coated copper, silver coated aluminum and carbon fibers. Combinations of boron nitride and silver or boron nitride and silver/copper also provide enhanced thermal conductivity. Boron nitride in amounts of at least 20 wt. % and silver in amounts of at least about 60 wt. % are particularly useful.

Of especial efficacy is a filler comprising a particular form of carbon fiber referred to as "vapor grown carbon fiber" (VGCF) such as is available from Applied Sciences, Inc., Cedarville, Ohio. VGCF, or "carbon micro fibers", are a highly graphized type by heat treatment (thermal conductivity=1900 w/m° C.). Addition of about 0.5 wt. % carbon micro fibers provides significantly increased thermal conductivity. Such fibers are available in varying lengths and diameters; namely, 1 mm to tens of centimeters length and from under 0.1 to over 100 $\mu$m in diameter. One useful form has a diameter of not greater than about 1 $\mu$m and a length of about 50 to 100 $\mu$m, and possess a thermal conductivity of about two or three times greater than with other common carbon fibers having diameters greater than 5 $\mu$m.

It is difficult to incorporate large amounts of VGCF in polymer systems such as the malenized rubber and olefin rubber combination discussed above. When carbon micro fibers, e.g. (about 1 $\mu$m, or less, are added to the polymer they do not mix well because the need to incorporate a large amount of fiber relative to the amount of polymer for beneficial improvement in thermal conductivity. However, we have found that relative large amounts of carbon micro fibers can be added to polymer systems that have relatively large amounts of other fillers. A greater amount of carbon micro fibers can be added to the polymer when added with other fibers than can be added alone to the polymer, thus providing a greater benefit with respect to improving thermal conductivity of the thermal interface material. Desirably, the ratio of carbon micro fibers to polymer is in the range of 0.05 to 0.50 by weight.

It is also advantageous to incorporate substantially spherical filler particles to maximize packing density. Additionally, substantially spherical shapes or the like will also provide some control of the thickness during compaction. Dispersion of filler particles can be facilitated by addition of functional organo metallic coupling agent such as organosilane, organotitanate, organozirconium, etc. typical particle sizes useful for fillers in the rubber material may be in the range of about 1–20 $\mu$m with a maximum of about 100 $\mu$m. Antioxidants may be added to inhibit oxidation and thermal degradation of the cured rubber gel. Typical useful antioxidants include Irganox 1076, a phenol type or Irganox 565, an amine type, (at 0.01% to about 1 wt. %), available from Ciba Giegy of Hawthorne, N.Y. Typical cure accelerators include tertiary amines such as didecylanethylamine, (at 50 ppm–0.5 wt. %)

To illustrate the invention, a number of examples were prepared by mixing the components described in Examples A through R below. For these examples reference is made to the commercial trade designation which is defined at the conclusion of the tables describing the samples.

As indicated in the tables, the properties of the compositions of viscosity, pot life, appearance after curing, modulus, glass transition temperature and thermal conductivity are also reported.

The examples shown include one or more of the optional additions, e.g., antioxidant, wetability enhancer, curing accelerators, viscosity reducing agents and crosslinking aids. The amounts of such additions may vary but, generally, they may be usefully present in the following approximate amounts (in wt. %): filler up to 95% of total (filler plus rubbers); wetability enhancer 0.1 to 1% (of total); antioxidant 0.01 to 1% (of total); curing accelerator 50 ppm–0.5% (of total); viscosity reducing agents 0.2–15%; and crosslinking aids 0.1–2%. It should be noted the addition at least about 0.5% carbon fiber significantly increases thermal conductivity.

TABLE 1

Compositions With Thermal Fillers

| | 1 | 2 | 3 | 4 | 5 | 6 | 7 |
|---|---|---|---|---|---|---|---|
| RICON 130 MA8 | 5 | 5 | 5 | 5 | 5 | 25 | 16 |
| PolyBd R45 | 5 | 5 | 5 | | | 25 | 16 |
| Kapton L2203 | | | | 5 | | | |
| TH21 | | | | | 5 | | |
| Ag Flake 1* | 90 | | | | | | |
| Ag Flake 2 | | 90 | | | | | |
| Ag Cu 107 | | | 90 | 90 | 90 | | |

TABLE 1-continued

| Compositions With Thermal Fillers | | | | | | | | |
|---|---|---|---|---|---|---|---|---|
| | 1 | 2 | 3 | 4 | 5 | | 6 | 7 |
| Boron Nitride PT120 | | | | | | | 50 | |
| Aluminum Nitride | | | | | | | | 68 |
| Viscosity (PaS) | 100 | 100 | 150 | 200 | 180 | | 210 | 200 |
| Pot Life @ 25° C. | <4 hrs. | >12 hrs. | >12 hrs. | >12 hrs. | >12 hrs. | >12 hrs. | >12 hrs. | >12 hrs. |
| Appearance after Cured @ 150° C./ 30 min. | N/A | -----(flexible elastomer film----- | | | | | | |
| Modulus @ 25° C. (Mpa) | N/A | 1.2 | 1.2 | 1.4 | 1.1 | | 0.8 | 1.1 |
| Glass Transition Temp (° C.) | N/A | −80 | −80 | −65 | −75 | | −80 | −75 |
| Thermal Conductivity w/m° C. | N/A | 1.5 | 1.45 | 1.3 | 1.4 | | 1.0 | 1.0 |

TABLE 2

| Compositions with Varying Cross-link Densities | | | | | | |
|---|---|---|---|---|---|---|
| | 8 | 9 | 10 | 11 | 12 | 13 |
| RICON 130 MA8 | 3.76 | 1.88 | 0.64 | 1.13 | 5.64 | 6.27 |
| PolyBd R45 | 3.76 | 5.64 | 6.88 | 6.39 | 1.88 | 1.25 |
| KR-TTS | 0.40 | 0.40 | 0.40 | 0.40 | 0.40 | 0.40 |
| Irganox 565 | 0.04 | 0.04 | 0.04 | 0.04 | 0.04 | 0.04 |
| Irganox 1032 | 0.04 | 0.04 | 0.04 | 0.04 | 0.04 | 0.04 |
| Ag Flake 2 | 91.5 | 91.5 | 91.5 | 91.5 | 91.5 | 91.5 |
| Ag Sphere | 0.5 | 0.5 | 0.5 | 0.5 | 0.5 | 0.5 |
| Viscosity (PaS) | 170 | 160 | 151 | 155 | 160 | 160 |
| Appearance after Cured @ 150° C./30' | non-tacky flexible film | tacky film | tacky soft gel | tacky film | flexible film | flexible film |
| Modulus @ RT (MPa) | 1.3 | 0.7 | 0.2 | 0.4 | 1.0 | 1.5 |
| Thermal Conductivity W/m° C. | 1.5 | 1.8 | 1.9 | 1.8 | 1.9 | 1.8 |

Note: Ag spheres, 50 μm diameter are added as spacers for bond thickness control.

TABLE 3

| Room Temperature Curable Compositions | | |
|---|---|---|
| | 14 | 15 |
| DAMA 1010 Amine* | 0.1 | 0.15 |
| RICON 130 MA8 | 1.1 | 1.07 |
| PolyBd R45 | 6.32 | 6.30 |
| KRTTS | 0.40 | 0.40 |
| Irganox 565 | 0.04 | 0.04 |
| Irganox 1032 | 0.04 | 0.04 |
| Ag Flake 2 | 91.5 | 91.5 |
| Ag Sphere | 0.5 | 0.5 |
| Viscosity (kcps) | 155 | 160 |
| Appearance after cure | tacky film | tacky film |
| Modulus @ RT (MPa) | 0.4 | 0.4 |
| Thermal Conductivity w/m° C. | 1.9 | 1.9 |

TABLE 4

| Compositions with Mixed Thermal Fillers, Reactive Diluents and Additional Cross-linker | | | | |
|---|---|---|---|---|
| | | 16 | 17 | 18 |
| KRTTS | | 0.4 | 0.42 | 0.81 |
| RICON 130 MA8 | | 0.90 | 1.0 | 1.94 |
| PolyBd R45 | | 5.00 | 5.63 | 10.91 |
| Drakeol 9LT | | 0.52 | 0.75 | 1.45 |
| Sovermol VP 95 | | 0.1 | 0.10 | 0.19 |
| Irganox 1076 | | 0.04 | 0.05 | 0.1 |
| Irganox 565 | | 0.04 | 0.05 | 0.1 |
| Ag Flake 2 | | 91.5 | | |
| Ag Cu 107 | | | 89.5 | 80 |
| Boron Nitride PT 120 | | 1.0 | 2 | 4 |
| Ag Sphere | | 0.5 | 0.5 | 0.5 |
| Viscosity (kcps) | | 114 | 120 | 70 |
| Cure @ 150° C./30 min | | -------tacky film------- | | |
| Modulus @ RT (MPa) | | 0.4 | 0.3 | |
| Thermal Conductivity w/m° C. | 2.5 | 3.0 | 1.5 | |

| | 19 | 20 | 21 | 22 | 23 | 24 | A |
|---|---|---|---|---|---|---|---|
| KRTTS | 0.4 | 0.4 | 0.4 | 2.8 | 1.25 | 1.0 | 5 |
| Ricon 130 MA8 | 5.0 | 5.0 | 5.0 | 35.7 | 17.9 | 13.2 | 71.5 |
| PolyBd R45 | 1.0 | 1.0 | 1.0 | 7.2 | 3.6 | 2.9 | 14.5 |
| Drakeol 9LT | 0.42 | 0.42 | 0.42 | 3.0 | 1.6 | 1.3 | 6.5 |
| Sovernol VP 95 | 0.1 | 0.1 | 0.1 | 0.7 | 0.35 | 0.26 | 1.3 |
| Irganox 1076 | 0.04 | 0.04 | 0.04 | 0.3 | 0.15 | 0.12 | 0.6 |
| Irganox 565 | 0.04 | 0.04 | 0.04 | 0.3 | 0.15 | 0.12 | 0.6 |
| Ag Flake | 91.5 | 91.5 | 90.5 | | | | |
| Ag Sphere | 0.5 | 0.5 | 0.5 | | | | |
| Boron Nitride (PT120) | 1.0 | — | — | 45 | | | |
| Carbon Fiber (VGCF) | — | 1.0 | 2.0 | 5 | 5 | 5 | |
| Silica Powder | — | — | — | — | 70 | — | |
| Aluminum Powder | — | — | — | — | — | 75 | |
| Viscosity (kcps) | 125 | 140 | 175 | 130 | 140 | 120 | 3.2 |
| Thermal Conductivity w/m° C. | 2.5 | 3.5 | 4.1 | 1.8 | 1.4 | 3.0 | 0.2 |
| Thermal Impedance $cm^{2}$° C./w | 0.42 | 0.24 | 0.20 | 0.45 | 0.6 | 0.40 | 4.8 |
| Carbon Fiber/Resin/ration | 0 | 0.14 | 0.20 | 0.10 | 0.2 | 0.25 | |

DEFINITIONS

RICON 130 MA8: Polybutadiene, molecular weight 3100, adducted with 8% maleic anhydride per rubber weight supplied by Ricon Resins, Inc. of Grand Junction, Colo.

Poly Bd R45: Hydroxyl terminated polybutadiene, molecular weight~2700 supplied by Elf Atochem of Philadelphia, Pa.

DAMA 1010 Amine: Didecylmethylamine which is a tertiaryamine acting as cure accelerator supplied by Albemarle Corp. of Baton Rouge, La.

Drakeol 9LT: Mineral oil as reactive diluent supplied by Pennreco of Dickerson, Tex.

Kapton L2203: Hydroxyl terminated poly (Ethylene/Butylene), molecular weight~4000 supplied by Shell Chemical of Houston Tex.

VGCF fiber: A high graphitized type by heat treatment (Thermal conductivity=1900 w/m° C. supplied by Applied Sciences of Cedarville, Ohio.

TH21: Hydroxyl terminated hydrogenated Polyisoprene (supplied by Kuraray, Japan).

Ag Flake 1: Contains an amino type of surfactant coating which acts as accelerator causing shortened pot life.

Ag Flake 2: Contains a surfactant coating inert to the cure reaction resulting in longer pot life.

Ag Cu 107: Silver plated copper powder.

KR-TTS: Organotitanate coupling agent added to enhance dispersion of fillers supplied by Kenrich of Bayonne, N.J.

Sovermol VP95: Fatty either triol as additional crosslinker, supplied by Henkel Corp. of Kankakee, Ill.

Irganox 565 & 1076 Antioxidants supplied by Ciba Geigy of Hawthorne, N.Y.

It is apparent from the foregoing that various changes and modifications may be made without departing from the invention. For example, more than one form of rubber of each type, or other additive, may be combined and more than one type of filler may be included. It is also clear by comparing the properties of all filler-containing examples with Example A of Table 4 that the combination of rubbers without filler has significantly less thermal conductivity, and greater thermal impedance, than the filler-containing examples. It is also evident the thermal conductivity of polymers, such as the rubbers described, can be improved most by incorporating carbon micro fibers.

Accordingly, the scope of the invention should be limited only by the appended claims, wherein what is claimed is:

1. A method of increasing the thermal conductivity of a compliant and crosslinkable material comprising incorporating therein carbon micro fibers and at least one thermally conductive filler.

2. A method according to claim 1 wherein said carbon micro fiber is present in an amount of at least about 0.5 wt. %, or in a ratio of carbon micro fibers to polymer of at least 0.05.

3. A method according to claim 2 further comprising additionally incorporating a filler comprising at least one of silver, copper, aluminum, and alloys thereof; boron nitride, aluminum nitride, silver coated copper, silver coated aluminum, and carbon fibers; and mixtures thereof.

4. A method according to claim 1 wherein said compliant and cross-linkable material comprises at least one saturated or unsaturated malenized rubber with maleic anhydride adducted to the molecule and at least one saturated or unsaturated hydroxy terminated olefin.

* * * * *